United States Patent
Morliere et al.

(10) Patent No.: US 12,276,209 B2
(45) Date of Patent: Apr. 15, 2025

(54) MOUNTING OF A SEALING RING ON AN AERONAUTICAL TURBINE ENGINE

(71) Applicant: SAFRAN AIRCRAFT ENGINES, Paris (FR)

(72) Inventors: Simon Nicolas Morliere, Moissy-Cramayel (FR); Nicolas Jean-Marc Marcel Beauquin, Moissy-Cramayel (FR); Thierry Fachat, Moissy-Cramayel (FR); Alain Dominique Gendraud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/922,288

(22) PCT Filed: Apr. 28, 2021

(86) PCT No.: PCT/FR2021/050737
§ 371 (c)(1),
(2) Date: Oct. 28, 2022

(87) PCT Pub. No.: WO2021/219960
PCT Pub. Date: Nov. 4, 2021

(65) Prior Publication Data
US 2023/0212953 A1 Jul. 6, 2023

(30) Foreign Application Priority Data
Apr. 30, 2020 (FR) ........................... 2004336

(51) Int. Cl.
*F01D 9/04* (2006.01)
*F01D 11/00* (2006.01)
(Continued)

(52) U.S. Cl.
CPC ............ *F01D 9/042* (2013.01); *F01D 11/005* (2013.01); *F01D 11/122* (2013.01); *F01D 25/243* (2013.01); *F05D 2240/11* (2013.01)

(58) Field of Classification Search
None
See application file for complete search history.

(56) References Cited

U.S. PATENT DOCUMENTS 5,593,277 A 1/1997 Proctor
6,783,324 B2 * 8/2004 Muny ................... F04D 27/023
415/173.1

(Continued)

FOREIGN PATENT DOCUMENTS

EP 1 847 686 A1 10/2007
EP 1 975 374 A1 10/2008
(Continued)

OTHER PUBLICATIONS

International Patent Application No. PCT/FR2021/050737, International Search Report and Written Opinion dated Sep. 28, 2021, 10 pgs.

(Continued)

*Primary Examiner* — Juan G Flores
(74) *Attorney, Agent, or Firm* — Cozen O'Connor

(57) ABSTRACT

The invention proposes an aeronautical turbine engine assembly comprising an upstream casing (55) to which guide blading (48*a*) is fastened, and a downstream casing (58) to which a sealing element (62) provided with an abradable material for rotor blading is fastened. This assembly further comprises a shroud ring (66) placed between the upstream casing and the downstream casing and fastening means (68) for detachably fastening the shroud ring. In order to be fastened to the upstream casing, the guide blading (48*a*) of the turbine engine is mounted on a downstream hook (480*b*) of the upstream casing, without being hooked (Continued)

onto the shroud ring (66), and the downstream casing (58) has an upstream hook with which the sealing element (62) is engaged in order to be fastened to the downstream casing, or the shroud ring has an upstream hook on which the sealing element (62) is mounted so as to be fastened to the downstream casing.

14 Claims, 3 Drawing Sheets

(51) Int. Cl.
*F01D 11/12* (2006.01)
*F01D 25/24* (2006.01)

(56) References Cited

U.S. PATENT DOCUMENTS

| 7,866,943 | B2 * | 1/2011 | Durand | F01D 25/246 |
| | | | | 415/173.1 |
| 11,092,027 | B2 * | 8/2021 | Freeman | F01D 11/08 |
| 2004/0033133 | A1 * | 2/2004 | Muny | F01D 25/246 |
| | | | | 415/175 |
| 2007/0231132 | A1 * | 10/2007 | Durand | F01D 25/246 |
| | | | | 415/209.2 |
| 2021/0148244 | A1 * | 5/2021 | Freeman | F01D 11/08 |

FOREIGN PATENT DOCUMENTS

| EP | 2 060 743 A1 | 5/2009 |
| FR | 2 989 722 A1 | 10/2013 |
| FR | 3 016 391 A1 | 7/2015 |

OTHER PUBLICATIONS

French Patent Application No. 2004336; Search Report dated Mar. 24, 2021; 8 pgs.

* cited by examiner

MOUNTING OF A SEALING RING ON AN AERONAUTICAL TURBINE ENGINE

CROSS-REFERENCE TO RELATED APPLICATIONS

This application is a 35 U.S.C. § 371 filing of International Application No. PCT/FR2020/050737 filed Apr. 28, 2021, which claims the benefit of priority to French Patent Application No. 2004336 filed Apr. 30, 2020, each of which is incorporated herein by reference in its entirety.

TECHNICAL FIELD

The invention relates, in the field of aeronautical turbine engines, to the design of sealing and fastening systems between a distributor and a sealing element for a mobile guide blading of the turbine engine, in particular in connection with the capacity provided of accessing the outer periphery of the sealing element (which can in particular be that typically known as a sealing ring or OSAS) and/or a casing area surrounding it.

PRIOR ART

From EP2060743, an example is known of an assembly for an aeronautical turbine engine extending about an axis (X) and comprising:
  an upstream casing disposed around the axis X and to which a guide blading of a distributor is fastened, the upstream casing being followed axially, in the downstream direction, by
  a downstream casing disposed around the axis X, whereon a sealing element provided with an abradable material intended to be facing a mobile guide blading of the turbine engine configured to rotate about the axis X is mounted.

A previous proposal has been to dispose a circlip type element between the upstream and downstream casings.

It is noted that in the present application:
  axial or axially means: along the axis of rotation of the mobile guide blading, or parallel with them, where said axis is also the longitudinal axis of the turbine engine about which the (mobile) guide bladings of the turbine(s), compressor(s), and fan if it exists rotate,
  "radially" means transversely to the axis X, therefore along the axis Z; therefore, radially, that which is outer is more distant in the axis X than that which is inner, and
  "upstream" and "downstream" are understood as axially, with respect to the general direction of flow of a fluid entering upstream and outflowing downstream.

A further suggestion has been, as in FR 2914350, to provide a single casing and fasten thereto, one downstream from the other, the distributor and the mobile guide blading by coupling them with hooks of the casing.

One problem is the accessibility to at least one of these hooks and/or to the outer periphery of the sealing ring, where it is coupled.

Indeed, in the case of a crack on a hook or on this area of the sealing ring, a full local disassembly of the area in question of the turbine engine may be required, which may give rise to problems of use, time and cost that are difficult to manage.

The aim of the invention is that of resolving at least some of the drawbacks mentioned above.

SUMMARY OF THE INVENTION

In order to improve the situation, the present document proposes that the assembly mentioned above comprising said upstream and downstream casing be such that it further comprises a shroud ring:
  inserted, about the axis of rotation of the mobile guide blading, between the upstream casing and the downstream casing, and
  removable fastening means for detachably fastening the shroud, the upstream casing and the downstream casing, having additional features such that:
  in order to be fastened to the first casing, the distributor of the turbine engine is mounted on a downstream hook of the upstream casing, without being coupled to the shroud ring, and
  either the shroud ring has an upstream hook for coupling the sealing element whereon the sealing element is mounted in order to be fastened to the downstream casing,
  or the downstream casing has an upstream hook for coupling the sealing element with which the sealing element is engaged in order to be fastened to the downstream casing.

It is recommended that, in the second case, the shroud ring be devoid of such an upstream hook for coupling said sealing element, which is favorable for mounting in terms of easiness, speed, mechanical effectiveness—especially transfers of loads, isostasy, etc.

In other words, it is recommended:
  if the downstream casing has an upstream hook for coupling the sealing element with which the sealing element is engaged in order to be fastened to the downstream casing,
  that the shroud ring be devoid of any upstream coupling hook intended for said fastening of the sealing element to the downstream casing.

The expression "mounted on" includes the possibility of the first part cited being coupled with the second part.

The sealing element cited above being annular, in one portion, or as preferred in several sectorized portions about said axis (X), the expression "sealing ring" is used hereinafter as synonymous with or a possible embodiment of said sealing element, while thus implicitly indicating that said sealing element extends circumferentially about said axis (X).

In any case, once the shroud ring has been removed, it will be possible, in principle via the upstream (once said mobile guide blading is located immediately downstream from the distributor), to access the outer periphery of the sealing ring and/or the surrounding casing area. Accessibility to the distributor and to the surrounding casing area will also be possible, moreover.

It will be understood that the proposed solution involves the manner in which the distributor and the sealing ring are fastened to the casings in question. Therefore, it is furthermore suggested that:
  in order to be fastened to the upstream casing, the distributor of the turbine engine be furthermore coupled with an upstream hook of the upstream casing located more upstream from the upstream casing than the downstream hook of the upstream casing, and/or that,
  in order to be fastened to the downstream casing, the sealing ring is furthermore coupled with a downstream hook of the downstream casing located more downstream from the downstream casing than the upstream hook for coupling the sealing ring.

Thus, it will be possible to create these additional couplings quite conventionally, despite the novelty of the design cited above with the removable shroud ring and the structural environment thereof also cited above.

In order to be fastened to the downstream casing, the sealing ring can particularly be kept squeezed between a hook of the downstream casing and a distributor portion itself located more downstream.

If the shroud ring has an upstream hook for coupling the sealing ring, it may furthermore be desired:
  that the sealing ring comprise an upstream edge defining a protuberance projecting in the upstream direction with respect to the abradable material, and
  that the upstream hook of the shroud ring have a circumferential edge which (will be double in that it) will comprise a radially inner wall and a radially outer wall between which the upstream edge of the sealing ring may be engaged.

Thus, on the shroud ring, there will be a hook open in the downstream direction, forming a circumferential groove wherein (a structural portion projecting in the downstream direction of) the sealing ring will be mounted.

This makes it possible not only to avoid providing on the downstream casing an upstream hook for upstream coupling of the sealing ring, but also to correctly position/center the sealing ring, which securing the fastening thereof thanks to the circumferential groove created.

Once again if the shroud ring has an upstream hook for coupling the sealing ring, it may also be desired that said radially outer wall of the double circumferential edge be axial and that a radially inner edge of the downstream casing abut against it.

This will favor the relative positioning of the casings, and the respective holding thereof, particularly with regard to the thermal and mechanical stress encountered and/or assembly/disassembly constraints.

In this regard, and for such a further enhanced end purpose, the upstream casing may have a downstream end edge facing radially outward and having (ending with) an axial circumferential shoulder configured to cover radially externally the upstream end of the downstream casing, where it may have an upstream end edge facing radially inward.

To enhance the aspects in respect of positioning/centering the sealing ring and securing the fastening thereof further, it may also be desired that both the radially inner wall and the radially outer wall forming said circumferential groove be axial, in the same way as said upstream edge of the sealing ring, thus ensuring axial relative positioning and engagement/disengagement, facilitating assembly/disassembly.

Also for these aspects in respect of relative positioning of the casings, respective holding and resistance to mechanical stress, it has also been provided that, should the shroud ring be devoid of an upstream hook for coupling the sealing element (therefore the scenario in which this upstream hook is on the downstream casing), said shroud ring can have an axial circumferential edge against which a radially inner edge of the downstream casing will abut. Thus, it will in particular be possible in this case to have a solution having a good casing load resistance.

It is moreover also proposed:
  that the upstream seals and the downstream seals be set up between the shroud ring and respectively, upstream, the distributor and, downstream, the sealing ring, and,
  that, radially externally with respect to said seals, the shroud ring have at least one channel or circuit connecting, for the ventilation:
    an upstream volume defined between the shroud ring, the upstream casing and the distributor and which will be isolated, by the upstream seals, from a jet of fluid wherein, radially internally with respect to said seals, a portion of the distributor and a portion of the mobile guide blading extend, and
    a downstream volume defined between the shroud ring, the downstream casing and the mobile guide blading and which will be isolated from said jet of fluid by the downstream seals.

Thus, it will be possible to favor the sealing, and therefore limit leakages and passages of hot fluid from said jet to the outside and in particular to these areas for coupling/suspension of the distributor and the sealing ring.

To also favor this sealing, it is also proposed that the shroud ring have a radially inner end, on either side whereof can extend (preferably up to the immediate proximity):
  upstream, an axial stop of the distributor, abutting against a radial surface of the shroud ring,
  downstream an upstream end protuberance of the sealing ring projecting in the upstream direction with respect to the abradable material.

Once again to favor the sealing cited above and a precise stable positioning of relatively easy access of the shroud ring, it is furthermore proposed:
  that, on either side of the shroud ring, the upstream casing and the downstream casing each have a radial edge through which, as removable fastening means, bolts for detachably fastening the shroud ring pass, and
  that the shroud ring be in the form of a radial ring which is extended radially inward, beyond said radial edges of the upstream casing and the downstream casing, and beyond said circumferential edge, up to an end inserted axially between the distributor and the sealing ring.

The invention also relates to an aeronautical turbine engine comprising an assembly.

DESCRIPTION OF THE EMBODIMENTS

The following non-limiting example of application and solution according to the invention relates to the possibility of enabling the repair of the OSAS (or sealing ring) of the first stage of the low-pressure turbine of an aeronautical turbine engine and/or enabling easy repair or replacement of the hook in question, if it is on the shroud (reference 66 hereinafter).

Figure 1:
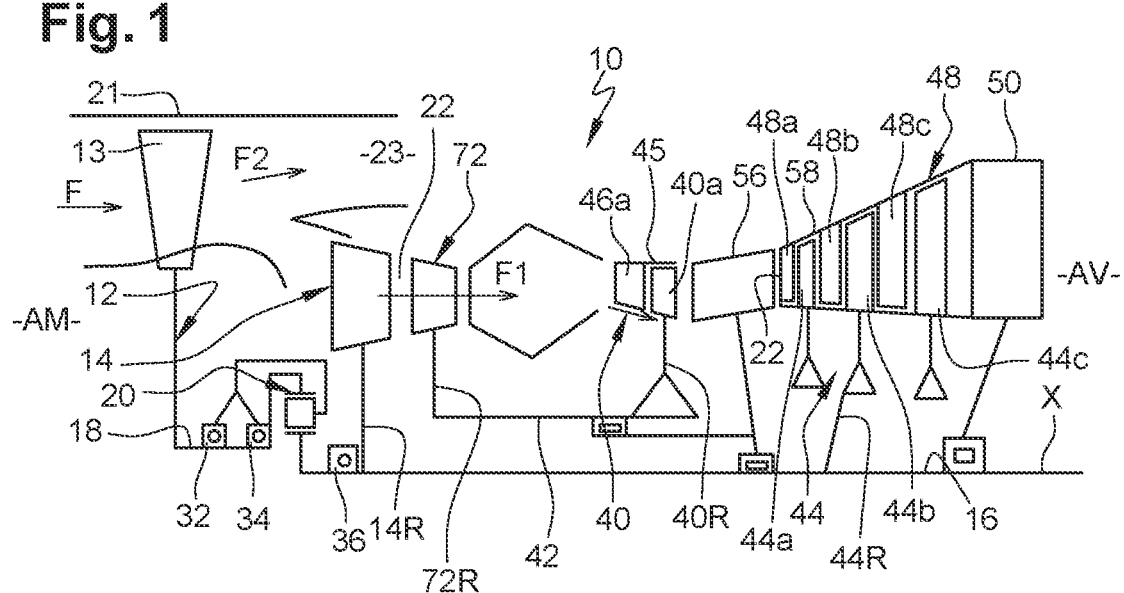
FIG. 1 schematically represents a double-flow aeronautical turbine engine according to the side view (symmetrical longitudinal half-section with respect to the axis X).

Thus, FIG. 1 represents a turbine engine 10 which can include all or part of the features according to the invention presented hereinabove.

In the following description, identical reference numbers denote parts that are identical or have similar functions.

The gas turbine engine 10 is here a dual-flow and dual-body turbojet.

The turbine engine 10 comprises, from upstream (AM) to downstream (AV) along the direction of flow of the gas streams F in the turbine engine, a fan 12, a low-pressure compressor 14, a high-pressure compressor 72, an annular combustion chamber 43, a high-pressure turbine 40 and a low-pressure turbine 44. The rotor 72R of the high-pressure compressor 72 and the rotor 40R of the high-pressure turbine 40 are connected by a high-pressure (HP) shaft 42 and form a high-pressure body therewith. The rotor 14R of the low-pressure compressor 14 and the rotor 44R of the low-pressure turbine 44 are connected by a low-pressure (LP) shaft 16 and form a low-pressure body therewith. In the upstream portion of the turbine engine 10, the fan 12 includes blades 13 which are connected to a fan shaft 18 which, in the example shown, is linked in rotation to the LP shaft 16 by means of a reduction gear 20. The fan 12 and the low-pressure compressor 14 thus form a low-pressure upstream module of the turbine engine. The HP 42 and BP 16 shafts extend along the longitudinal axis X of the turbine engine 10. The turbine engine 10 also comprises a fan casing 21 which extends around the blades 13 and which defines an air entry jet of the streams F.

A portion F1 of air F enters an inner annular flow jet 22 of a first stream and the other portion F2 feeds an outer annular flow jet 23 of a secondary stream.

The jet 22 passes through the low-pressure 14 and high-pressure 72 compressors, the combustion chamber 43 and the high-pressure 40 and low-pressure 44 turbines. The outer jet 23 surrounds the casings of the compressors and the turbines and joins the primary jet 22 in a nozzle (not shown) of the turbine engine 10. The HP 40 and BP 44 turbines are each housed in a corresponding HP turbine casing 45 and a corresponding LP turbine casing 58, which bear fixed series of corresponding distributors, such as 46a and 48a, 48b, 48c inserted between series of mobile guide blades, such as 40a, 44a, 44b, 44c. Downstream from the LP turbine casing 58, an exhaust casing 50 is used to discharge the gases having circulated in the primary jet 22. An inter-turbine casing 55 is disposed between the HP 40 and LP 44 turbines, and more specifically between the HP turbine casing 45 and the LP turbine casing 58.

Figure 2:
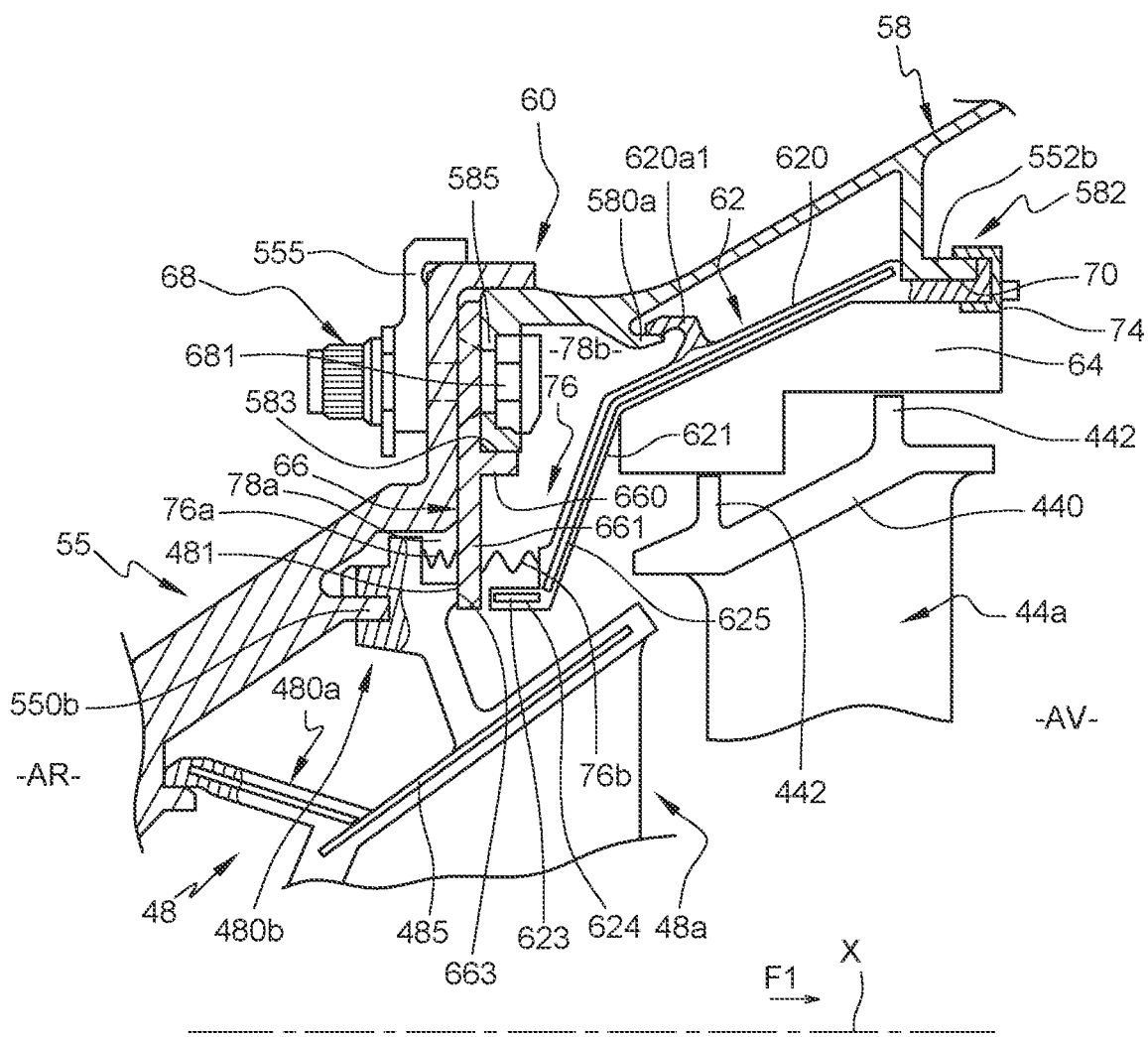
FIG. 2 schematically represents a portion of the low-pressure compressor of the turbine engine in FIG. 1, as a cross-section along the axis X, this portion being provided with a solution according to the invention, according to a first embodiment.
Figure 3:
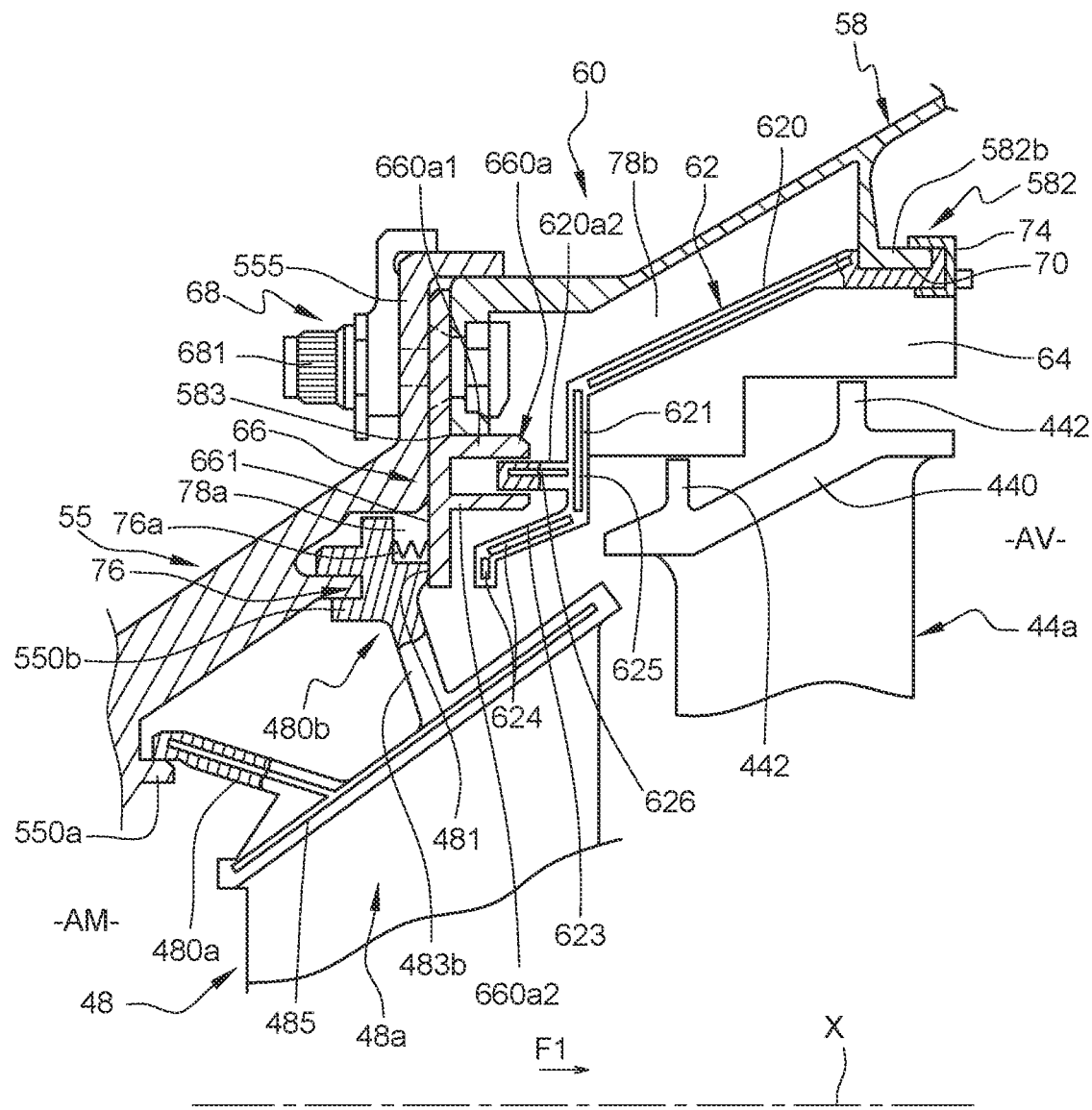
FIG. 3 schematically represents the same portion of the low-pressure compressor as in FIG. 2, as a cross-section along the axis X, but with a second embodiment of a solution according to the invention.

The two possible embodiments of the solution according to the invention which have been more specifically devised and are schematically represented in FIGS. 2 and 3 are described as follows.

Firstly, and as can be observed in the details of these FIGS. 2 and 3, the solution according to the invention can in particular be applied at the location of a connection area between an upstream casing and a downstream casing, at the LP turbine 48.

This area, which can thus correspond to that referenced I in FIG. 1, and therefore to the area connecting the inter-turbine casing 56 and the LP turbine casing 58, illustrates an aeronautical turbine engine assembly 60 extending about the axis X and comprising means facilitating access to the OSAS (62 hereinafter).

In such an assembly, therefore such as that referenced 60, a guide blading of a distributor, such as the first 48a of the LP turbine 48, is fastened at the outer periphery to the upstream casing, such as the casing 55, which is therefore followed axially, in the downstream direction, by the downstream casing, such as the LP turbine casing 58, also disposed about the axis X.

To this casing is fastened, also at the outer periphery, a sealing element 62 provided with an abradable material 64 intended to face a mobile guide blading, such as the guide blading 44a configured to rotate about the axis X.

As noted hereinabove, the sealing element 62 will be referred to by convention as "sealing ring".

At the outer periphery, the sealing ring 62 comprises an annular structure 620 having at the outer periphery an upstream fastening element and a downstream fastening element, to be fastened to the downstream casing 48.

At the inner periphery, the annular structure 620 comprises the abradable material 64 which is disposed radially to the mobile guide blading 44a, in line therewith.

The annular structure 620 can typically be in the form, about the axis X, of a ring made of one piece or formed from successive circumferential sectors (typically known as ring sectors), in the same way as for the abradable material 64 which can comprise a circumferential succession of blocks.

Like any mobile guide blading, the guide blading 44a comprises mobile blades movable about the axis X, in a circumferential succession thereabout, each having at the outer periphery a succession of mobile blade platforms, such as 440, each provided with outer seals (or sealing elements) 442 surrounded externally with a small radial gap by abradable material 64.

To facilitate the access cited above, the assembly 60 further comprises a shroud ring 66 inserted, about the axis X, between the upstream casing 55 and the downstream casing 58, and removable fastening means 68 for fastening the shroud 66, the upstream casing 55 and the downstream casing 58 together, detachably.

For the fastening 480b thereof to the upstream casing, the distributor, therefore here 48a, is mounted on a downstream hook 550b of the upstream casing 55, without being hooked to (i.e., coupled in contact with) the shroud 66.

In respect of the fastening to the downstream casing, two solutions are therefore proposed:

either the shroud 66 has an upstream hook 660a for engaging with the sealing ring 62 in order to fasten it to the downstream casing; see FIG. 3, or the downstream casing 58 has an upstream hook 580a with which the sealing ring 62 is engaged in order to fasten it to the downstream casing, the shroud ring 66 then being devoid of such an upstream hook whereon the sealing element is mounted; see FIG. 2.

In the description, hook and rail are synonymous, the same applies for hooked and coupled. Thus, both the sealing ring 62 and the distributor 48a are each coupled with rails formed on the upstream casing, the downstream casing, or the shroud ring 66.

The upstream hook, depending on the case 660a or 580a, corresponds to the upstream fastening element cited above.

If the solution of an upstream hook (or rail) 580a on the downstream casing is chosen, as in FIG. 2, then this hook is used for coupling a cooperating hook 620a1 defining an upstream fastening for the sealing ring 62.

The upstream hook (or rail) 580a1 protrudes at the outer periphery of the annular structure 620.

If the solution of an upstream hook (or rail) 660a on the shroud 66 is chosen, as in FIG. 3, then this hook is used for coupling a cooperating hook 620a2 defining an upstream fastening for the sealing ring 62.

The upstream hook (or rail) 620a2 protrudes at the outer periphery of the annular structure 620.

Furthermore, for a downstream fastening 582 to the downstream casing, here 58, the sealing ring 62 can furthermore be mounted on a downstream hook 582b of the downstream casing 58 located more downstream from this downstream casing than the upstream coupling hook 660a or 580a.

In particular, the downstream fastening element 582 can be defined, on the annular structure 620, by an annular groove 70 opening radially outward and wherein the downstream rail or hook 582b is fitted.

An additional circumferential hook 74 can secure the fastening by radially sandwiching the downstream rail or hook 482b and a downstream portion of the annular structure 620.

The rails or hooks 580a, 582b, 550b, 660a extend in the downstream direction.

The respective associated rails or hooks 620a1, 74, 480b, 620a2 extend in the upstream direction.

Engaged via downstream, the additional circumferential hook 74 can be opened in the upstream direction.

However, it might be preferred that, for the downstream fastening 582 thereof, the sealing ring 62 be held on the downstream hook 582b, by being squeezed there by a distributor portion located immediately downstream (not shown) in turn pressed against the downstream hook 582b by a strip along the inner surface of the downstream casing, at the outer periphery of this distributor portion.

Furthermore, for an upstream fastening 480a to the upstream casing 55, the distributor, here 48a, is furthermore mounted on (coupled to) an upstream hook 550a of the upstream casing. This upstream hook 550a is located more upstream from the upstream casing 55 than the downstream hook 550b.

Like any distributor, that one 48a comprises fixed vanes in circumferential succession about the axis X. Each fixed vane has, at the outer periphery, a platform 485. The upstream coupling hook or rail 480a and downstream coupling hook or rail 480b cited above are formed at the free end of a spoiler, respectively upstream 483a and downstream 483b, mounted on respective hooks of the casing.

The respective associated rails or hooks 620a1, 74, 480b, 620a2 extend in the upstream direction.

While the hooks or rails 580a, 582b, 550b, 620a1, 620a2 can be formed from single protuberances, the hooks or rails 480b, 660a, 74 could be formed from double protuberances.

Thus, in a case which can be that of FIG. 3, it was provided to prefer:
that the sealing ring 62 comprise, as an upstream hook 620a2, an upstream edge defining a protuberance projecting in the upstream direction with respect to the abradable material 64, and
that the upstream hook 660a of the shroud ring 66 have a circumferential edge or a double circumferential rail which has a radially outer wall 660a1 and a radially inner wall 660a2 between which the upstream edge forming the hook 620a2 of the sealing element is engaged.

For a favorable load orientation, the upstream hooks 620a2 and 660a (therefore the walls 660a1,660a2 if they exist) will be axial, like the free ends of the other hooks or rails. For the setting of the parts concerned and a favorable load transmission, it may moreover be provided that a radial stop be carried out by means of the shroud ring 66.

Two possibilities devised:
as illustrated in FIG. 2, that, the shroud ring 66 being devoid of this upstream hook whereon the sealing ring 62 is mounted, the shroud ring has an axial circumferential edge 660 abutting against (a free end of) a radially inner edge 583 of the downstream casing 58, or
as illustrated in FIG. 3, that the radially outer circumferential edge 660a1 is axial and that (a free end of) a radially inner edge 583 of the downstream casing 58 abuts against it.

For a fastening that is lasting, easy to implement and detachable, the fastening means 68 will preferably successively axially pass through the upstream casing 55, the shroud 66 and the downstream casing 58.

Axially, on either side of the shroud ring 66, the upstream casing 55 and the downstream casing 58 will usefully each have a radial edge, respectively 555 or 585 (see FIGS. 2,3), through which, as said removable fastening means, bolts 681 providing said detachable fastening of the shroud ring 66 will pass.

The radial edge 555 extends outward. The radial edge 585 extends inward.

The bolts 681 will be regularly circumferentially distributed, about the axis X.

Moreover, the shroud ring 66 will then usefully be in the form of a radial ring which extends, radially inward:
beyond said radial edges 555 or 585 of the upstream casing and the downstream casing,
and beyond the circumferential edge 660 or 660a1,
to an end 661 inserted axially between the distributor 48a and the sealing ring 62.

A two-fold effect—mechanical and sealing—is thus favored.

In particular in this case, it may also be provided, for the same purposes, that the shroud ring 66 have a radially inner end, also referenced 660 in FIGS. 2,3, axially on either side of which will extend:
upstream, an axial stop 481 of the distributor 48a, abutting against a radial surface 663 of the shroud ring 66, and
downstream, an upstream end protuberance 623 of the sealing ring 62, projecting in the upstream direction with respect to the abradable material 64.

The axial stop 481 may usefully be formed, at the outer periphery of each of the fixed vanes of the distributor 48a, by a radial edge at the downstream face of the downstream rib 483b which incorporates at its end the downstream hook 480b.

For load control, the axial stop 481 will be usefully formed substantially coaxially to the coupling between the hooks 480b and 550b.

The sealing in this area, around the shroud ring 66, has moreover been shaped, so as to limit the leakages of (hot) fluid F1 from the jet 22 to the outer periphery, beyond the platforms 485, 440, or to the upstream 55 and/or downstream 58 casing.

So as to protect these casings and the couplings cited above of the distributor 48a and the sealing element 62, it is furthermore proposed that the seals 76 be set up between the shroud ring 66 and respectively, upstream, the distributor 48a and, downstream, the sealing ring 62.

Two solutions are proposed for these seals 76:
either the seals 76 comprise upstream 76a and downstream 76b seals, such as omega seals, set up between the shroud ring 66 and respectively, upstream, a radial face of the distributor 48a and, downstream, a radial face of the sealing ring 62, as in FIG. 2,
or the seals 76 comprise a sectorized upstream seal 76a and, as a downstream seal, the hook or rail 620a2 (on its unengaged portion in the upstream direction in the rail 660a), these seals being set up between the shroud ring 66 and respectively, upstream, a radial face of the distributor 48a and, downstream, a radial portion 621 of the annular structure 620 located upstream from the abradable material 64, as in FIG. 3.

It is beyond the radial portion 621, extending it radially inward and in the upstream direction, that the protuberance 623 defines the upstream end of the annular structure 620 of the sealing ring 62.

Figure 4:
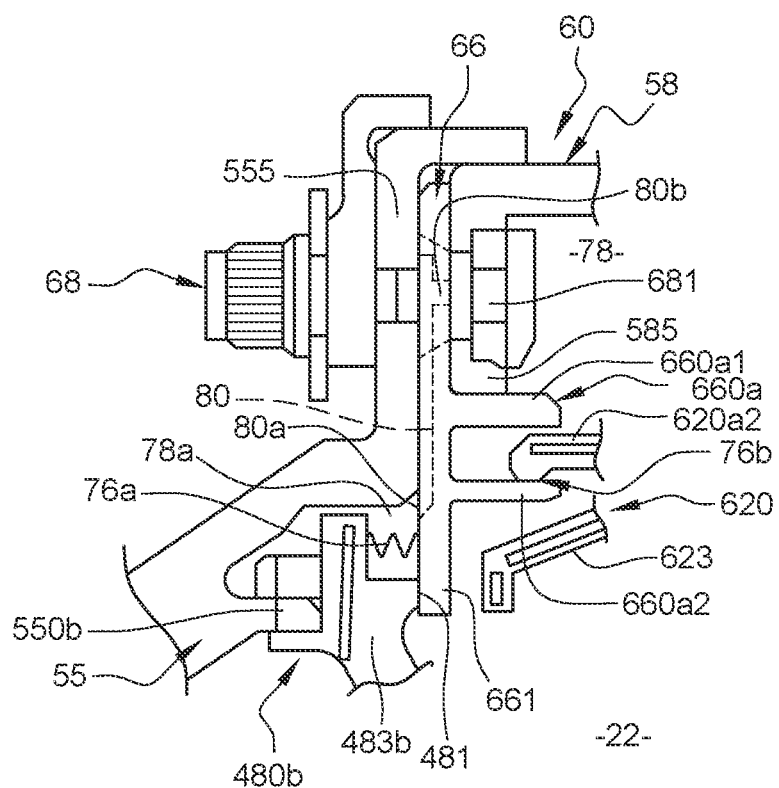
FIG. 4 represents an enlarged portion of the view in FIG. 2.
Figure 5:
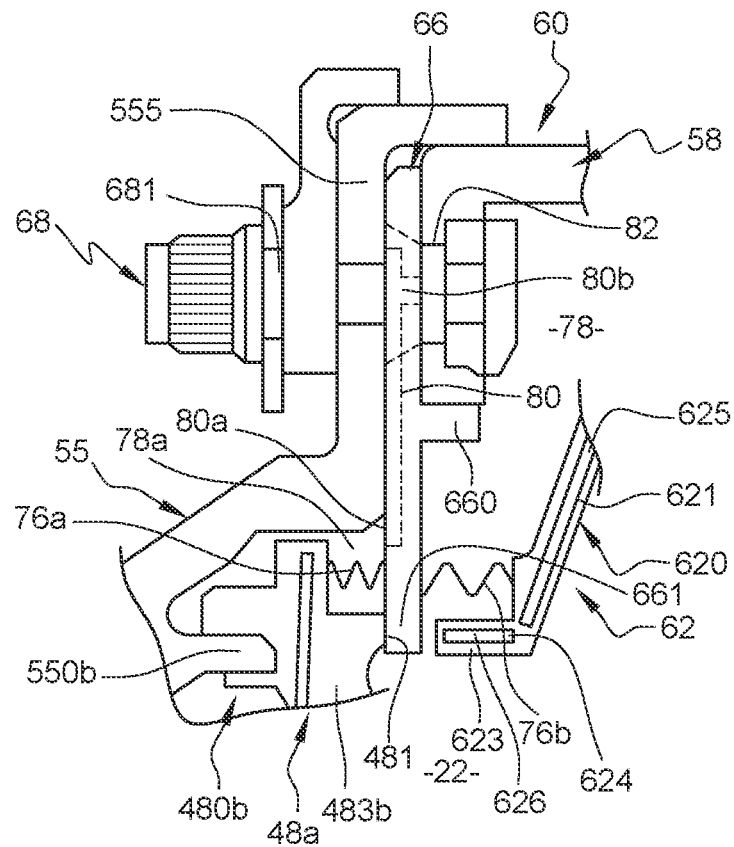
FIG. 5 represents an enlarged portion of the view in FIG. 3.

Thus, it will be possible to create radially externally with respect to these seals 76:
  an upstream volume 78a defined between the shroud ring 66, the upstream casing 55 and the distributor 48a (the end of the rib 483b thereof), this upstream volume 78a being isolated, by the upstream seals 76a, or also by the downstream support 481 against the shroud ring 66 and the coupling 480b, of the jet 22, and
  a downstream volume 78b defined between the shroud ring 66, the downstream casing 58 and the sealing ring 62 (the annular structure 620 thereof), this downstream volume 78b being isolated from said jet 22 by the downstream seals 76b: coupling support between the rail 660a and the hook 620a which is engaged therein particularly for this purpose, as in the solution in FIG. 4, or structural seals, such as omega seals, as in the solution in FIG. 5. Once these upstream 78a and downstream 78b volumes have been created, it will moreover be possible to enhance the control of the temperature rise around the jet 22.

Thus, it is then proposed that, radially externally with respect to the seals 76a, the shroud ring 66 has at least one ventilation channel or circuit 80 connecting the upstream and downstream volumes 78a, 78b.

For this connection, the ventilation circuit 80 has at least one upstream opening 80a leading to the upstream volume 78a and at least one downstream opening 80a leading to one of the passages 82 which passes through the edge 585 to allow passage and one of the fastening means 68. In this way, the ventilation circuit 80 is connected with the downstream volume 78a.

It should furthermore be noted that, in the portions forming rail portions 621,623, see also 620a2 when this portion exists, sealing tabs 624, 626 ensuring the inter-sector sealing of the sealing ring 62 will preferably be present.

Thus, it will be possible to choose that the sealing element 62, in particular the annular structure 620 thereof, be circumferentially formed of several sectorized portions about the axis X.

In this case, it will furthermore usefully be possible to provide:
  that the upstream end protuberances 623, or that the radial portions 621, of two such circumferentially successive sectorized portions of the sealing element 62, in particular the annular structure 620 thereof, be circumferentially connected with each other by sealing tabs 624, 625, and/or
  that the upstream edges 620a2 of such circumferentially successive sectorized portions of the sealing element 62, in particular the annular structure 620 thereof, be circumferentially connected with each other by sealing tabs 626.

The invention claimed is:

1. An assembly for an aeronautical turbine engine extending about an axis and comprising:
  an upstream casing disposed around the axis and to which a guide blading of a distributor is fastened, the upstream casing being followed axially, in the downstream direction, by
  a downstream casing disposed around the axis, whereon a sealing element provided with an abradable material intended to be facing a mobile guide blading of the aeronautical turbine engine configured to rotate about the axis is mounted,
the assembly further comprising:
  a shroud ring inserted, about the axis, between the upstream casing and the downstream casing, and
  removable fastening means for fastening the shroud ring, the upstream casing and the downstream casing together, detachably,
  for said fastening thereof to the upstream casing, the distributor is mounted on a downstream hook of the upstream casing, without being hooked to the shroud ring, and:
    either the shroud ring has an upstream hook for coupling the sealing element for said fastening thereof to the downstream casing,
    or the downstream casing has an upstream hook whereon the sealing element is mounted for said fastening thereof to the downstream casing,
wherein:
  if the downstream casing has said upstream hook whereon the sealing element is mounted for said fastening thereof to the downstream casing,
  then the shroud ring is devoid of the upstream hook intended for said fastening of the sealing element to the downstream casing.

2. The assembly according to claim 1, wherein, for said fastening thereof to the upstream casing, the distributor is mounted on an upstream hook of the upstream casing located more upstream than the downstream hook of the upstream casing.

3. An assembly for an aeronautical turbine engine extending about an axis and comprising:
  an upstream casing disposed around the axis and to which a guide blading of a distributor is fastened, the upstream casing being followed axially, in the downstream direction, by
  a downstream casing disposed around the axis, whereon a sealing element provided with an abradable material intended to be facing a mobile guide blading of the aeronautical turbine engine configured to rotate about the axis is mounted,
the assembly further comprising:
  a shroud ring inserted, about the axis, between the upstream casing and the downstream casing, and
  removable fastening means for fastening the shroud ring, the upstream casing and the downstream casing together, detachably,
  for said fastening thereof to the upstream casing, the distributor is mounted on a downstream hook of the upstream casing, without being hooked to the shroud ring, and:
    either the shroud ring has an upstream hook for coupling the sealing element for said fastening thereof to the downstream casing,
    or the downstream casing has an upstream hook whereon the sealing element is mounted for said fastening thereof to the downstream casing,
wherein, for said fastening thereof to the downstream casing, the sealing element is furthermore mounted on a downstream hook of the downstream casing located more downstream than the upstream hook whereon the sealing element is mounted.

4. An assembly for an aeronautical turbine engine extending about an axis and comprising:

an upstream casing disposed around the axis and to which a guide blading of a distributor is fastened, the upstream casing being followed axially, in the downstream direction, by a downstream casing disposed around the axis, whereon a sealing element provided with an abradable material intended to be facing a mobile guide blading of the aeronautical turbine engine configured to rotate about the axis is mounted, the assembly further comprising:
 a shroud ring inserted, about the axis, between the upstream casing and the downstream casing, and
 removable fastening means for fastening the shroud ring, the upstream casing and the downstream casing together, detachably,
 for said fastening thereof to the upstream casing, the distributor is mounted on a downstream hook of the upstream casing, without being hooked to the shroud ring, and:
  either the shroud ring has an upstream hook for coupling the sealing element for said fastening thereof to the downstream casing,
  or the downstream casing has an upstream hook whereon the sealing element is mounted for said fastening thereof to the downstream casing,
 wherein:
 the sealing element comprises an upstream edge defining a protuberance projecting in the upstream direction with respect to the abradable material, and
 the upstream hook of the shroud ring has a circumferential edge which has a radially outer wall and a radially inner wall between which the upstream edge of the sealing element is engaged.

5. The assembly according to claim 4, wherein the radially outer wall of the circumferential edge is axial and a radially inner edge of the downstream casing abuts against it.

6. The assembly according to claim 4, wherein:
 on either side of the shroud ring, the upstream casing and the downstream casing each have a radial edge through which, as said removable fastening means, bolts for detachably fastening the shroud ring pass, and
 the shroud ring is in the form of a radial ring which is extended radially inward, beyond said radial edges of the upstream casing and the downstream casing, and beyond said circumferential edge, up to an end inserted axially between the distributor and the sealing element.

7. The assembly according to claim 4, wherein:
 the sealing element is circumferentially formed of several sectorized portions around said axis,
 the upstream edges of two circumferentially successive sectorized portions of the sealing element are circumferentially connected with each other by sealing tabs.

8. An assembly for an aeronautical turbine engine extending about an axis and comprising:
 an upstream casing disposed around the axis and to which a guide blading of a distributor is fastened, the upstream casing being followed axially, in the downstream direction, by
 a downstream casing disposed around the axis, whereon a sealing element provided with an abradable material intended to be facing a mobile guide blading of the aeronautical turbine engine configured to rotate about the axis is mounted,
the assembly further comprising:
 a shroud ring inserted, about the axis, between the upstream casing and the downstream casing, and
 removable fastening means for fastening the shroud ring, the upstream casing and the downstream casing together, detachably,
 for said fastening thereof to the upstream casing, the distributor is mounted on a downstream hook of the upstream casing, without being hooked to the shroud ring, and:
  either the shroud ring has an upstream hook for coupling the sealing element for said fastening thereof to the downstream casing,
  or the downstream casing has an upstream hook whereon the sealing element is mounted for said fastening thereof to the downstream casing,
 wherein, being devoid of the upstream hook whereon the sealing element is mounted, the shroud ring has a circumferential edge which is axial and against which a radially inner edge of the downstream casing abuts.

9. An assembly for an aeronautical turbine engine extending about an axis and comprising:
 an upstream casing disposed around the axis and to which a guide blading of a distributor is fastened, the upstream casing being followed axially, in the downstream direction, by
 a downstream casing disposed around the axis, whereon a sealing element provided with an abradable material intended to be facing a mobile guide blading of the aeronautical turbine engine configured to rotate about the axis is mounted,
the assembly further comprising:
 a shroud ring inserted, about the axis, between the upstream casing and the downstream casing, and
 removable fastening means for fastening the shroud ring, the upstream casing and the downstream casing together, detachably,
 for said fastening thereof to the upstream casing, the distributor is mounted on a downstream hook of the upstream casing, without being hooked to the shroud ring, and:
  either the shroud ring has an upstream hook for coupling the sealing element for said fastening thereof to the downstream casing,
  or the downstream casing has an upstream hook whereon the sealing element is mounted for said fastening thereof to the downstream casing,
 wherein the shroud ring has a radially inner end on either side whereof extend:
 upstream, an axial stop of the distributor, abutting against a radial surface of the shroud ring,
 downstream, an upstream end protuberance of the sealing element projecting in the upstream direction with respect to the abradable material.

10. The assembly according to claim 9, wherein:
 the sealing element is circumferentially formed of several sectorized portions around said axis,
 the upstream end protuberances of two circumferentially successive sectorized portions of the sealing element are circumferentially connected with each other by sealing tabs.

11. The assembly according to claim 9, wherein:
 the sealing element comprises an upstream edge defining a protuberance projecting in the upstream direction with respect to the abradable material,
 the upstream hook of the shroud ring has a circumferential edge which has a radially outer wall and a radially inner wall between which the upstream edge of the sealing element is engaged, on either side of the shroud ring, the upstream casing and the downstream casing each have a radial edge through which, as said removable fastening means, bolts for detachably fastening the shroud ring pass, and the shroud ring is in the form of a radial ring which is extended radially inward, beyond said radial edges of the upstream casing and the downstream casing, and beyond said circumferential edge, up to an end inserted axially between the distributor and the sealing element.

12. An assembly for an aeronautical turbine engine extending about an axis and comprising:

an upstream casing disposed around the axis and to which a guide blading of a distributor is fastened, the upstream casing being followed axially, in the downstream direction, by a downstream casing disposed around the axis, whereon a sealing element provided with an abradable material intended to be facing a mobile guide blading of the aeronautical turbine engine configured to rotate about the axis is mounted, the assembly further comprising:

a shroud ring inserted, about the axis, between the upstream casing and the downstream casing, and removable fastening means for fastening the shroud ring, the upstream casing and the downstream casing together, detachably, for said fastening thereof to the upstream casing, the distributor is mounted on a downstream hook of the upstream casing, without being hooked to the shroud ring, and:

either the shroud ring has an upstream hook for coupling the sealing element for said fastening thereof to the downstream casing, or the downstream casing has an upstream hook whereon the sealing element is mounted for said fastening thereof to the downstream casing, wherein:

upstream seals and downstream seals are disposed between the shroud ring and respectively, upstream, the distributor and, downstream, the sealing element, and, radially externally with respect to said upstream seals and downstream seals, the shroud ring has at least one ventilation circuit connecting an upstream volume defined between the shroud ring, the upstream casing and the distributor and which is isolated, by the upstream seals, from a jet of fluid wherein, radially internally with respect to said upstream seals and downstream seals, a portion of the distributor and a portion of the mobile guide blading extend, and a downstream volume defined between the shroud ring, the downstream casing and the sealing ring and which is isolated from said jet of fluid by the downstream seals.

13. The assembly according to claim 12, wherein the shroud ring has a radially inner end on either side whereof extend:

upstream, an axial stop of the distributor, abutting against a radial surface of the shroud ring, downstream, an upstream end protuberance of the sealing element projecting in the upstream direction with respect to the abradable material, the sealing element is circumferentially formed of several sectorized portions around said axis, and the upstream end protuberances of two circumferentially successive sectorized portions of the sealing element are circumferentially connected with each other by sealing tabs.

14. An aeronautical turbine engine comprising the assembly according to claim 1.

* * * * *